United States Patent

[11] 3,621,395

| [72] | Inventors | Harold L. Brown<br>109 Westline Road, Azle, Tex. 76020;<br>LeRoy M. Vaught, Rte. 1, Box 529J,<br>Burleson, Tex. 76028 |
|---|---|---|
| [21] | Appl. No. | 843,627 |
| [22] | Filed | July 22, 1969 |
| [45] | Patented | Nov. 16, 1971<br>Continuation-in-part of application Ser. No. 594,806, Nov. 16, 1966, now abandoned. |

[54] A METHOD AND APPARATUS FOR DETERMINING THE CUTTING TIME OF A MACHINE TOOL
7 Claims, 5 Drawing Figs.

| [52] | U.S. Cl. | 324/181, 77/5.2 |
|---|---|---|
| [51] | Int. Cl. | G04f 9/00 |
| [50] | Field of Search | 324/181, 71, 34 PS, 34 R |

[56] References Cited
UNITED STATES PATENTS
3,339,434  9/1967  Sparling ..................  77/5 (.2)

Primary Examiner—Alfred E. Smith
Attorney—Charles C. M. Woodward

ABSTRACT: Means for accurately determining actual cutting time of a machine tool through inducing a radiofrequency voltage directly into the machine frame, then detecting amplitude modulation of the current flowing in the machine which amplitude modulations result from rapid and continuous current changes caused by the make and break of the cutter blades and the workpiece. These amplitude-modulated radiofrequency signals are converted to pulses which are used to actuate a timing or recording means.

HAROLD L. BROWN
LEROY M. VAUGHT
INVENTORS

BY

*Charles F. Woodward*
ATTORNEY

A METHOD AND APPARATUS FOR DETERMINING THE CUTTING TIME OF A MACHINE TOOL

This is a continuation-in-part of our copending application Ser. No. 594,806 filed Nov. 16, 1966 and now abandoned.

The present invention relates generally to a novel method and apparatus for accurately determining and recording the actual elapsed time in which a machine tool is cutting a workpiece, as differentiated from spurious spindle rotation.

More specifically, the present invention relates to a portable apparatus which employs a radiofrequency oscillator adapted to drive an induction coil which is magnetically coupled to the frame of the machine tool; a radiofrequency voltage is subsequently induced into the machine-tool frame. A second induction coil operates in conjunction with a radiofrequency receiver; the second induction coil is magnetically coupled to the same machine frame and senses the radiofrequency currents in the frame. The radiofrequency receiver and its associated demodulator then detects the existence of any RF frequency current modulation. Varying amplitudes generated by variations in the RF current are detected in the receiver, that is, the amplitude modulation manifests itself in the form of pulses at the receiver-detector output. The pulses are created by the cutting of a workpiece by its associated machine-tool cutter which changes the level of the RF current within the frame. The detected pulses are used to operate a timer to give an accurate indication of machine-cutting time.

In the course of investigation of the durability and longevity of machine tools, and the efficiency of personnel operating such tools, it becomes important to measure the length of service of a particular tool and, in particular, to record the history of operation of the tool, i.e., the intervals between cuts, the length of time per cut when the machine is actually cutting metal, and the time lost in set up, insertion and removal of the workpiece. This information is vital, especially when employed in considering the efficiency of numerically controlled machine tools. It is of little value to know the time during which the spindle of the machine is rotating alone, or the time during which the cutter is merely in contact with the workpiece. This invention contemplates the provision of the method and electronic circuitry for accurate determination of the actual elapsed time during which the machine-tool cutter is cutting a workpiece.

Many devices, both electronic and mechanical, have been evolved in the past to try to determine the desired actual cutting time. These prior devices in general do not derive their information pertaining to cutting from the cutter itself; rather, they employ some related phenomenon such as vibrations or secondary signal-generating means. Two of the most relevant devices from the prior art are these disclosed in U.S. Pats. Nos. 2,946,646 and 2,562,975. The device shown in U. S. Pat No. 2,946,646 employs a circuit including a tool, a commutating means, a source of direct current, and the associated workpiece. In this instance the circuit is conductively completed when the tool is in contact with the workpiece, thus activating an elapsed time meter; which is responsive to the commutated current in the circuit.

This prior art system has many disadvantages, a few of which are the required insulating of the spindle shaft from the basic machine frame to prevent spurious interference or shorting, and resultant false cutting indications. Such insulation necessitates that the machine tool be retrofitted or modified to permit insulation of the spindle shaft, transfer gears, etc. It is obvious that the required insulation would become more difficult in proportion to the increase in machine size and complexity, and in many of the present machine tools it would ultimately approach the impossible to achieve reliable insulation. In addition, when the cutting tool is left in contact with the workpiece the circuit is closed, permitting the associated DC current to heat the workpiece and machine-tool cutter, which obviously results in shorter cutter life and may result in detrimental electrolysis. The design of such prior art devices is not conducive to high sensitivity since the current always flows through the transformer in one direction. This design requirement allows the transformer core to become saturated over an extended period of time drastically reducing its sensitivity. In addition, this type device employs a secondary unrelated source for its cutting information signal, and therefore has inherent unreliability.

The remaining prior art device of interest, U.S. Pat. No. 2,562,975, also possesses intrinsic inaccuracy when applied to machine tools or the like. This inaccuracy is due to the fact that it also utilizes a secondary source of cutting-time information, i.e., machine vibration. It is apparent that, even though steps were taken to eliminate inaccurate readings due to spurious signals, the reliability would be very tenuous where subject to many residual vibrations in a factory. Additionally, if the sensitivity of such a recorder is reduced to preclude the recognition of false signals, small light cutting and drilling operations would not provide sufficient machine vibration to be recorded.

The present invention overcomes these and other disadvantages of the prior art by the detection of modulation of a radiofrequency carrier which can only be generated, in this instance, by the intermittent alternation of the electrical circuit path caused by the cutting action of a machine-tool cutter. This is accomplished by inducing a radiofrequency voltage in the preferred embodiment generated by an RF oscillator into the frame of the machine tool by means of an electromagnetic induction coil.

The operation and theory of the device may be explained by referring to the equivalent circuit shown in FIG. 5. An electromagnetic induction coil A representative of induction energizer 16 of FIG. 1 subsequently described is fed from a source of radiofrequency energy. This creates magnetic lines of force D which cut the machine frame E. The machine frame acts as a one-turn pickup for the magnetic lines of force. In other words, the electromagnetic induction coil A and the machine frame E act as a loosely coupled transformer. Therefore, as a result of radiofrequency current in the electromagnetic induction coil, a voltage $e_1$ is induced in the machine frame which acts as the one-turn secondary of the transformer. Switch $S_1$ is representative of the intermittent contact between the cutting tool and the workpiece during the cutting operation.

Inductance $L_M$ and its associated resistance $R_M$ represent the series inductance of the equivalent circuit of the machine frame. Inductance $L_S$ and its associated resistance $R_s$ represent the inductance and resistance of a cutting head. Inductance $L_F$ and its associated resistance $R_F$ represent the shunt path offered by other portions of the machine not associated with the measurement circuit. Therefore $e_2$ is representative of the open-circuit voltage which appears across the cutter-workpiece B when they are not in contact.

The machine tool coming into contact with the workpiece is represented in the equivalent circuit by the closure of switch $S_1$; the circuit is now closed, and a current $i_1$ will flow. If the circuit is closed intermittently corresponding to the cutter/workpiece interaction, current $i_1$ will also flow intermittently.

Current $i_1$ is limited by the impedance of the circuit; most specifically, it is limited by the resistance and self inductance $R_s$ and $L_s$ of the machine spindle. In order to obtain maximum current, it is desirable to obtain a low resistance for $R_s$. It must be remembered that the spindle is rotating and that a lubricant is normally applied to the bearing which supports the spindle. Unfortunately, the lubricant is an imperfect conductor, making resistance $R_s$ high and variable. It has been found useful in practice to reduce the value of $R_s$ by providing a brush contact between the frame and the spindle. This maximizes the current $i$ and eliminates any possible problem of intermittent contact caused by the lubricant.

A pickup coil C representative of pickup coil 18 of FIG. 1 is shown in the branch of the equivalent circuit representative of a spindle. The machine tool E acts as a one-turn primary, and the magnetic pickup coil C acts as the secondary of a transformer. This transformer action is brought about by the spindle current $i_1$ creating an RF magnetic field which in turn induces a voltage in the pickup coil. This induced voltage is amplified and detected in the receiver.

Ideally, the pickup coil is mounted directly opposite the induction device (i.e., halfway around the current path "loops"), thus making the induced voltage directly responsive to current $i_1$. If mechanical constraints dictate that the pickup coil be mounted in a nonoptimum location, additional currents may be sensed by the pickup coil. In this case, the "noncontact" current sensed by the pickup coil is not zero. The action of the tool and workpiece alternately making and breaking contact may therefore result in only a variation of the sensed current, which manifests itself as a modulation of the voltage sensed by the coil.

The rapid make and break of the cutter and the workpiece amplitude modulates the RF current that flows in the machine. This modulation is produced in short pulses; the frequency and duration of these pulses are determined by the number of cutter blades and the rotational speed of the cutter. The modulation is typical of amplitude modulation in that two sidebands are also present, which sidebands are determined by the modulating frequency of the cutter. Cutting time is recorded by detecting the RF-current modulation by means of a magnetic pickup coil attached to the surface of the machine tool. RF currents are picked up by the pickup coil, and the pickup coil output is connected to the input of a radio receiver tuned to the frequency of the RF source. The RF receiver has a demodulator circuit in order to detect modulation of the RF current if existent. If the cutter is merely rotating and not cutting, the RF current remains unmodulated, therefore, even though a signal is received by the receiver, since no modulation occurs it is not "seen" by its associated demodulator. If, however, the cutter is actually cutting, current modulation occurs which, when received by the RF receiver, can be detected or "seen" by its associated demodulator. The demodulator output voltage is an audio signal whose voltage corresponds to the envelope of the sensed signal; this voltage is fed to an audio amplifier, where it is amplified and rectified to permit activation of a relay which subsequently controls a recording instrument such as a clock, recorder or any other suitable recording device.

It is specifically noted that unless the radiofrequency carrier current is modulated by the cutter, no cutting action can possibly be erroneously recorded. It is, therefore, possible for three conditions to exist relative to the cutter and associated workpiece.

The first condition resides in the condition wherein the cutter is revolving but not, in any manner, in contact with the workpiece. In this instance the radiofrequency current is not modulated. Therefore, when no modulated input is received by the RF receiver, the demodulator is unable to detect an audio signal, thus preventing activation of the relay and recording devices.

In the second instance wherein the machine tool is in contact with the workpiece but is not cutting, the current will change when initial contact is made due to the rerouting of the RF current through the frame. However, then the RF current becomes constant in value. This initial variation in current will be detected momentarily as a small spike which would activate the recording devices momentarily. However, this occurrence is prevented by the incorporation of a delay circuit to preclude false starts or indications.

The third condition is the only condition wherein the recording instruments can be actuated, i.e., when the machine-tool cutter is cutting. The cutter, making and breaking contact with the workpiece, causes rapid and continuous changes of the current sensed by the magnetic pickup coil. The RF current is modulated to some amplitude value; this modulation is detectable by the RF receiver demodulator circuitry which is used to activate the cutting-time recording devices.

It is therefore a principle object of the present invention to provide a portable electronic device that is capable of accurately determining and recording the elapsed time during which a machine tool is actually cutting a workpiece.

It is a further object to provide a device wherein modulation of an induced radiofrequency current resultant from the cutting action of a machine-tool cutter on the workpiece effects the activation of suitable time-recording devices.

It is still another object to provide an electronic machine-tool-cutting device wherein false indications cannot be created by spurious vibrations and electromagnetic energy generally associated with manufacturing facilities.

It is still another object to provide a portable device operable to determine whether a cutting tool is cutting a workpiece which is remotely disposed from the operator, such as in outer space, within the depths of the ocean or in an oil well.

Other and further features and objects of the invention will become more apparent to those skilled in the art upon a consideration of the following description wherein various constructional configurations of the electronic device are disclosed, taken in conjunction with the drawings, wherein.

Figure 1:
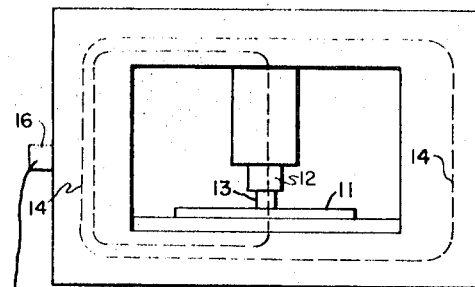
FIG. 1 illustrates schematically the suggested locations of the inducing and receiving coils upon closed machine frames having single spindles and the path of RF-current propagation through such a frame.
Figure 2:
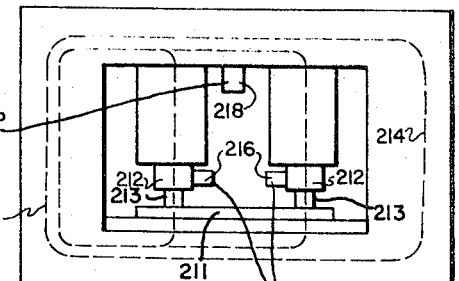
FIG. 2 illustrates the suggested location of the inducing and receiving coils on a closed machine frame having dual spindles and reveals the path of RF-current propagation through this type of frame.
Figure 3:
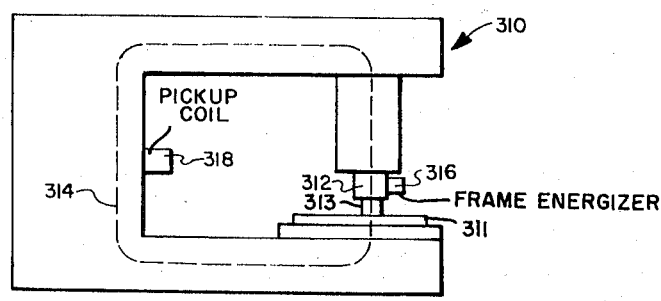
FIG. 3 illustrates schematically a typical location of the inducing and receiving coils on a machine frame of the open-type having one spindle and shows the path of the RF current within the frame.
Figure 5:
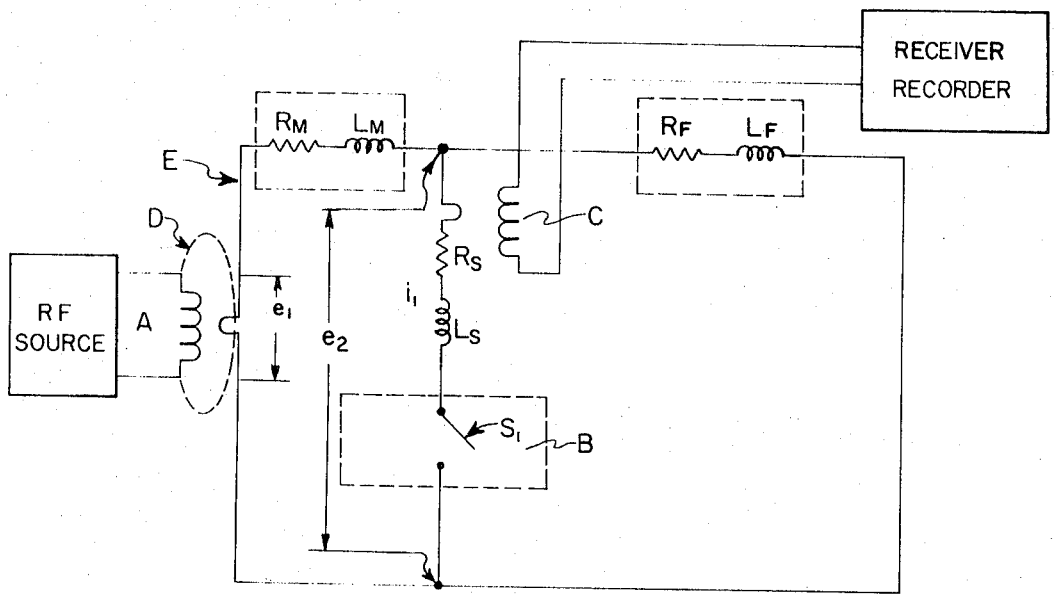
FIG. 5 illustrates schematically an equivalent circuit illustrated of the theory of the invention.

Referring now to FIGS. 1, 2, and 3, the inducing and receiving components may be positioned on any open-or closed-frame machine tool, indicated generally by 10.

In general, the voltage-inducing means is positioned upon the machine frame or affixed to the spindle or spindles while the receiving coil is generally positioned halfway around the loop described by the propagation path of the radiofrequency current. The location of the receiving coil in relation to the voltage-inducing means is important to insure proper operation. Experience with the device and a knowledge of the radiofrequency carrier propagation paths within the frame have shown that the optimum coil position varies from machine-frame type to machine-frame type. Further, the coils should be located upon the inside surfaces of the machine frame where possible due to the intrinsic skin effect created at the carrier frequencies employed.

Thus, FIG. 1 illustrates a closed machine-tool frame 10, supporting thereon a single workpiece 11 and a spindle 12 having cutter element 13. Such a machine-frame configuration generally results in the propagation of radiofrequency energy as indicated at 14. In this specific frame configuration, induction means or frame energizer 16 may be located on the frame 10 or in the instance where a brush is employed to minimize the effect of lubricant, as previously noted on the spindle 12. In order to obtain the most desirable or best signal, receiving coil 18 may be located upon frame 10 in opposed position to voltage-inducing means 16. Where dual spindles are employed, as illustrated in FIG. 2, induction means 216 are located on both spindles 212 each having cutter element 213 contacting workpiece 211 and are fed by a single power source through, for example, cables (not shown) as well known in the art. In this configuration, the induction means may be connected in series, or parallel, the type of connection, as well as the phasing is determined at installation so as to produce the strongest signal in coil 218, pickup or receiving coil 218 is located to receive the strongest signal practicable. Pickup coil 218 is used to sense the current in each spindle.

Where an open-frame machine tool 310 having workpiece 311 thereon is instrumented as illustrated in FIG. 3, frame current-inducing means 316 is positioned on spindle 312 having cutter element 313 thereon and receiving coil 318 is positioned anywhere the strongest signal occurs on frame 310.

Figure 4:
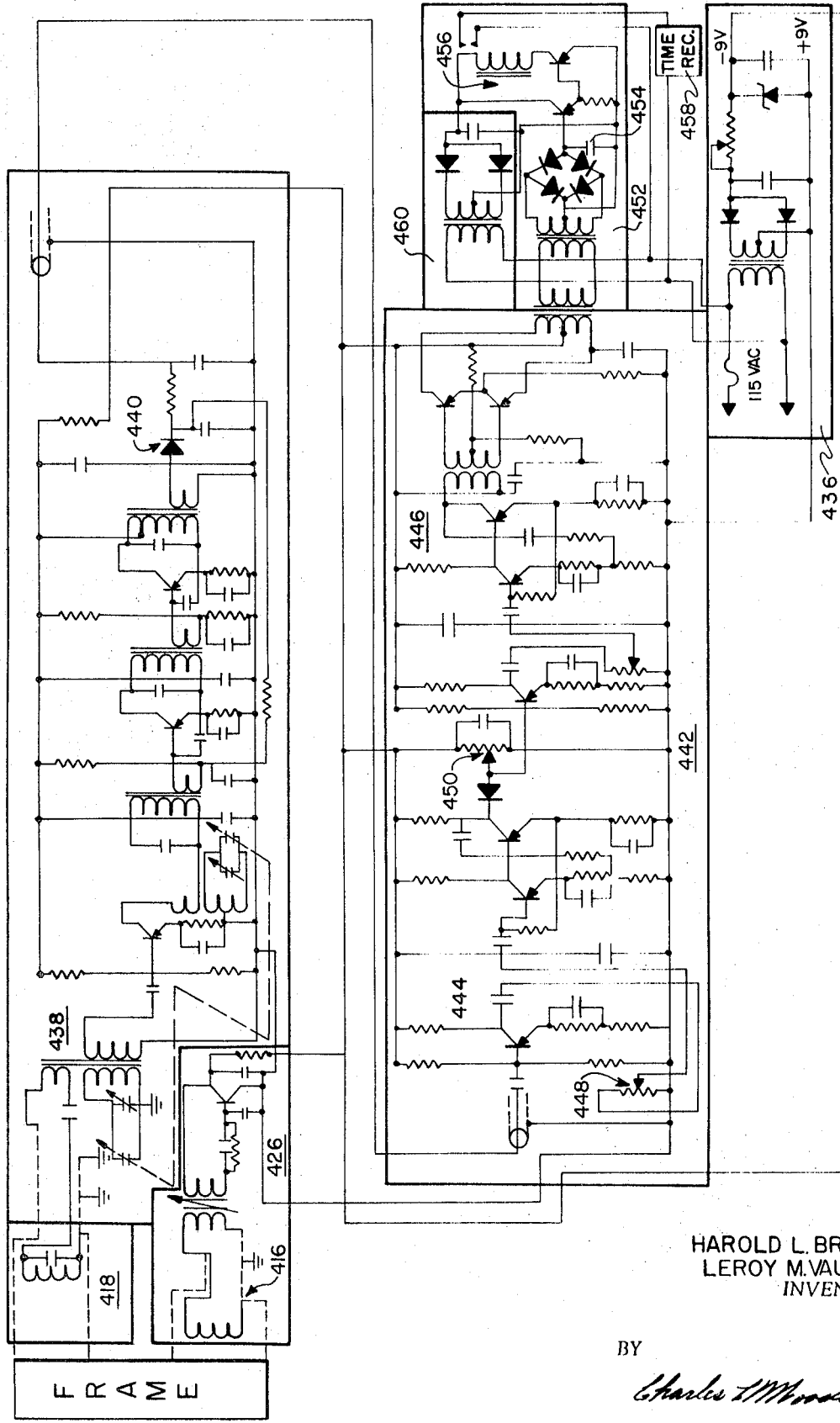
FIG. 4 is a block schematic diagram of the present invention illustrating the various electronic stages.

Referring now to a preferred embodiment shown in FIG. 4 of the drawings, the sequence of components is begun with electromagnetic induction coil 416. Coil 416 is electronically coupled and responsive to a radiofrequency oscillator 426 driven by power supply 436. As hereinabove indicated, induction coil 416 may be positioned upon the machine frame as illustrated in FIG. 1. Receiving or pickup coil 418 is electronically coupled to amplitude-modulated radiofrequency receiver 438. Receiver 438 may be of the tuneable superheterodyne type, or tuned radiofrequency receiver type, and must be capable of an audio output from the demodulator stage. The frequency employed by the preferred embodiment is 700 kilocycles, however, it will be readily understood that any reasonable frequency may be utilized. Radiofrequency receiver 438 has a demodulator circuit 440, which is coupled to audio-amplifier section 442. Amplifier section 442 comprises a preamplifier 444 and power amplifier 446. Radiofrequency receiver 438 and audio-amplifier section 442 have therebetween gain control 448. Preamplifier 444 and power amplifier 446 also have a suitable reference control 450. Audio amplifier 442 is electronically coupled to relay amplifier 452 which incorporates a suitable time-delay adjustment 454. Relay amplifier 452 activates relay 456 and hence time-recording device 458. Relay amplifier 452 and relay 456 are driven by power supply 460. In the preferred embodiment, all electronic coupling is accomplished with suitable shielded cable.

The invention operates in the following manner. Radiofrequency oscillator 426 generates a 700 kilocycle RF current which is magnetically induced into the machine frame by means of induction coil 416. The amplitude of this induced RF voltage is a function of the specific machine-tool frame configuration. The unmodulated RF current resulting from the induced voltage is thereupon picked up by an electromagnetic pickup coil 418 attached to the machine frame which thereafter feeds the signal to radiofrequency receiver 438, where, since the voltage picked up by pickup coil 418 is constant when there is no cutting taking place, there is no generated audio-output in that no modulation can be detected or "seen" by demodulator 440. If, however, the monitored current is changed by the cutting action of the machine tool, pulses of amplitude modulation of the RF current occur and thus an output is generated. Demodulator 440 separates the audio portion of the signal from the modulation envelope and feeds it to preamplifier 444 of audio amplifier section 442 where it is amplified. The baseline of the incoming audio signal is thereafter shifted by reference control 450 to trim the spurious noise from the original base. Further, control 450 and its associated diode and input capacitor has the effect of a pulse shaper. The modified (shaped) signal from reference control 450 is again amplified in power amplifier 446 and passed relay on to relay amplifier 452. Relay amplifier 452 incorporates a time-delay circuit 454, in the preferred embodiment, delays actuation of relay 456 up to 3 seconds in order to prevent false starts, i.e., if the modulation detected is due to workpiece contact but no cutting is occurring, or any other spurious spike of modulation the delay will permit it to appear and diminish prior to the relays being energized. In this manner all false starts are prevented. Additionally, time delay 454 delays activation of relay 456 a corresponding 3 seconds after the modulated signal has stopped to insure complete accuracy. Upon energizing relay 456, time-recording device 458 is activated and timing is begun.

Proper installation and adjustment of the device of the present invention is accomplished by first tuning the radiofrequency receiver to pick up the oscillator signal utilizing an oscilloscope set for approximately one-half volt of full-scale deflection. Thereafter, with the machine tool in a cutting operation, the radiofrequency receiver is again adjusted to detect the cutter signal (modulation), which signal lies between and including the two sidebands created by the amplitude modulation responsive to frame current changes. This is accomplished by slightly detuning the RF receiver from the center of the oscillating frequency to one of the created sidebands. Such detuning further prevents receiver saturation by the oscillator. It is noted that such detuning is not necessary where the machine-frame size is such that the oscillator energy will not tend to saturate the RF receiver. Furthermore, the oscillator has a very low output and easily falls within the permitted legal power requirements established by the Federal Communications Commission for such industrial devices. Now the remainder of the gain and level controls are adjusted so that the action of the relay closely corresponds to the condition of the machine, i.e., whether it is cutting or not. Obviously, other methods of generating a radiofrequency voltage in the machine will be apparent to those skilled in the art, as for example, broadband radiofrequency energy may be introduced into the machine directly by energizing the spindle through the brush, the broadband radiofrequency current being generated by the inherent arcing which will be present at the brush contact with the spindle. Regardless of the specific current induction means, the pickup coil and receiver remain unchanged in accordance with the invention and operate as above described in that the component of the RF current in the machine tool which is in the passband of the receiver will be amplified and cause actuation of the relay as previously noted.

In summary, the present invention comprises a method and apparatus for inducing an RF current into the supporting frame of a machine tool whereupon the RF current is modulated by any change occurring in the intrinsic frame current path and associated pulses of amplitude modulation caused by incremental contact of a cutter with a workpiece affixed to the frame. The modulated energy subsequently is converted to an audio signal capable of energizing a suitable timing device. If, however, the carrier is unmodulated, i.e., no actual cutting is taking place, the carrier has no audio portion, therefore, the timing device cannot be activated.

What is claimed is:

1. The method of recording the actual time a machine tool is removing material from a workpiece comprising:
   A. inducing an RF current into a machine frame;
   B. detecting any series of amplitude-modulated RF-current pulses resultant from changing current within the frame by cutter action; and
   C. causing said detected modulated signal to be converted to a voltage operable to actuate a recording device.
2. The method defined by claim 1 wherein:
   A. said induced RF current is amplitude-modulated by rapid changes of the frame current resultant from the make and break of a tool and workpiece during material cutting;
   B. said modulated current detection is accomplished by the demodulator circuit of a radiofrequency receiver the output voltage or which is an audio signal having a voltage corresponding to the envelope of the sensed signal;
   C. amplifying and rectifying said audio-signal voltage; and
   D. causing said amplified audio-signal voltage to actuate a recording instrument relay.
3. The method defined by claim 2 wherein:
   said step of relay actuation includes delaying the relay response to said amplitude audio-signal voltage for a predetermined period to prevent erroneous starts occasioned by any momentary, sporadic variation in frame current;
4. A device for determining actual cutting time of a machine tool comprising:
   A. means for inducing a radiofrequency current into a machine frame;
   B. means for detecting amplitude-modulated pulses of radiofrequency current which are responsive to variations in frame current resultant from the change in current path due to the make and break action of cutter teeth during removal of material from the workpiece; and
   C. means for recording the time interval during which said amplitude-modulated pulses are received by said detecting means.
5. The device as defined in claim 4 wherein:

A. said means for inducing the voltage into the machine frame comprises a radiofrequency oscillator electronically coupled to an induction coil responsive thereto, said induction coil magnetically inducing an RF current into the machine; and
B. said detecting means comprises in part a radiofrequency receiver and means operative to amplify the detected signal to cause the energization of said recording means.

6. The device as defined by claim 5 wherein:
A. said radiofrequency receiver includes a demodulator circuit the output voltage of which is an audio signal having a voltage corresponding to the envelope of the sensed signal; said amplifying means includes an audio amplifier operatively associated with means for discriminating against spurious noise from said amplified signal; and
B. said time-recording means energization means comprises relay amplifier means operatively associated with means to delay energization of said recording means for a predetermined period to prevent recordings resultant from sporadic signals.

7. The device as defined by claim 4 wherein:
A. said detecting means comprises a radiofrequency receiver including a demodulator circuit the output voltage of which is an audio signal having a voltage corresponding to a portion of the envelope of the sensed signal and means operative to amplify the detected signal; and
B. means for recording the time interval during which said amplitude-modulated pulses are received by said detecting means, comprising relay amplifier means operatively associated with means to delay energization of a relay controlling said recording means for a predetermined period to prevent recordings resultant from sporadic signals.

* * * * *